United States Patent
Minoura et al.

[11] 4,327,959
[45] May 4, 1982

[54] TWO-DIMENSIONAL SCANNING DEVICE WITH DEFLECTION SCANNING PLANE AND OPTIC AXIS MAINTAINED PARALLEL

[75] Inventors: Kazuo Minoura, Yokohama; Takehiko Kiyohara, Zama; Jun Saito, Kawasaki, all of Japan

[73] Assignee: Canon Kabushiki Kaisha, Tokyo, Japan

[21] Appl. No.: 108,059

[22] Filed: Dec. 28, 1979

[30] Foreign Application Priority Data

Dec. 30, 1978 [JP] Japan .................................. 53/164669

[51] Int. Cl.$^3$ ............................................. G02B 27/17
[52] U.S. Cl. ...................................... 350/6.3; 350/6.6; 350/6.8
[58] Field of Search ........................ 350/6.3, 6.5–6.91; 346/76 L, 108; 358/293, 206, 208

[56] References Cited

U.S. PATENT DOCUMENTS

| | | | |
|---|---|---|---|
| 1,136,761 | 4/1915 | Becker | 350/6.3 |
| 3,668,984 | 6/1972 | Rosin | 305/6.5 |
| 3,797,908 | 3/1974 | Ward et al. | 358/293 |
| 3,946,150 | 3/1976 | Grafton | 350/6.8 |
| 3,961,838 | 6/1976 | Zanoni | 350/6.8 |
| 3,973,833 | 8/1976 | Lawson | 350/6.8 |

*Primary Examiner*—Jon W. Henry
*Attorney, Agent, or Firm*—Fitzpatrick, Cella, Harper & Scinto

[57] ABSTRACT

A two-dimensional scanning device is provided with a two-dimensional deflector having a major scanning deflecting surface for two-dimensionally deflecting an incident light, the major deflection rotation axis of the deflector being determined so that the positional relation thereof with the deflecting surface is invariable, the minor deflection rotation axis of the deflector being determined orthogonally to an axis parallel to the major deflection rotation axis or orthogonally to the major deflection rotation axis, the deflector being for causing the incident light to be incident on the deflecting surface in parallelism to the minor deflection rotation axis or on the minor deflection rotation axis, and a scanning lens disposed between the two-dimensional deflector and a scanning surface, and a scanning lens for receiving the deflected light from the two-dimensional deflector and causing the scanning light to emerge toward the scanning surface. The major scanning deflecting surface and the optic axis of the scanning lens are parallel to each other, the scanning lens is pivotally moved in synchronism with the minor deflection rotation of the two-dimensional deflector and moreover, the focus of the scanning lens is always contained in the scanning surface, and the major scanning speed and minor scanning speed of the scanning beam on the scanning surface are constant.

7 Claims, 22 Drawing Figures

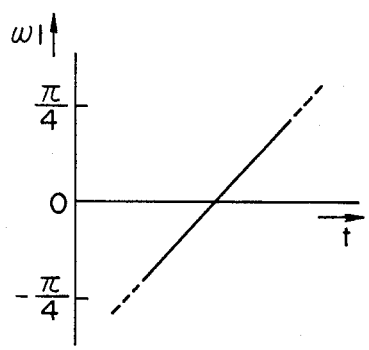
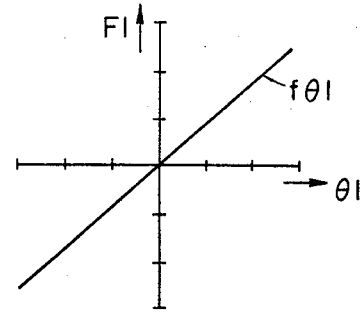
FIG. 4A                FIG. 4B
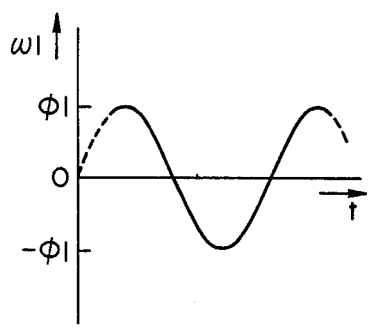
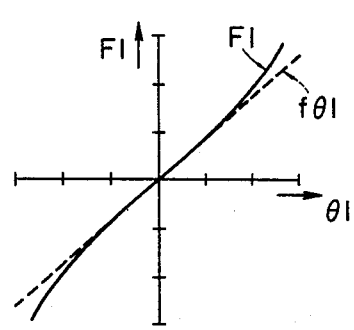
FIG. 5A                FIG. 5B
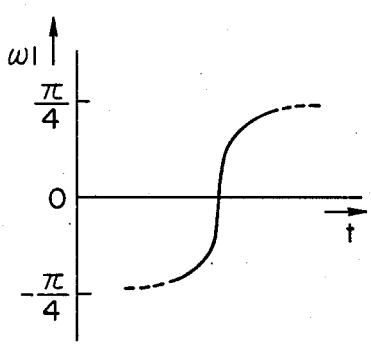
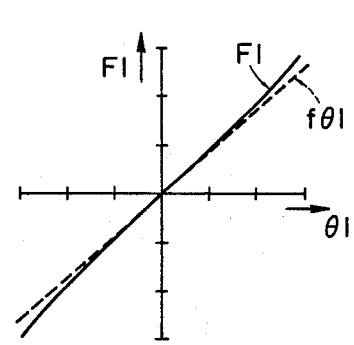
FIG. 6A                FIG. 6B

DEFLECTION CENTER
OF MINOR SCANNING

DEFLECTION CENTER
OF MINOR SCANNING

TWO-DIMENSIONAL SCANNING DEVICE WITH DEFLECTION SCANNING PLANE AND OPTIC AXIS MAINTAINED PARALLEL

BACKGROUND OF THE INVENTION

1. Field of the Invention

This invention relates to a two-dimensional scanning device for writing or reading a figure by two-dimensional scanning, and particularly to such a device which effects strain-free scanning while preserving a completely linear relation between a signal and the scanning position.

2. Description of the Prior Art

In the field of two-dimensional scanning device, such a two-dimensional scanning device as disclosed in U.S. application Ser. No. 549,281 filed on May 11, 1966 and now U.S. Pat. No. 3,465,352 or U.S. Pat. No. 3,450,455 is known. In any of these devices, when the rotation angle range of the major deflection is constant with respect to the minor deflection, scanning having a strain as shown in FIG. 1 of the accompanying drawings is effected on a scanning surface. In FIG. 1, the major scanning is effected in parallelism to the X'-axis and the minor scanning is effected in the direction of the Y'-axis. To correct such a distorted scanning figure, the signal must be electrically corrected and this requires a position detector or a memory of huge memory capacity or an operational circuit for correction.

SUMMARY OF THE INVENTION

It is the object of the present invention to provide a two-dimensional scanning device in which scanning strain is corrected by optical and mechanical means without using the above-mentioned complicated electrical signal processing means. In other words, as shown in FIG. 2 of the accompanying drawings, when the rotation angle range of the major deflection (X'-direction) is constant with respect to the minor deflection (Y'-direction), a strain-free scanning figure may be obtained by appropriately constructed optical and mechanical means, whereby for signals entered at a predetermined time interval, a completely linear relation may be maintained between the input signals and the scanning position so that their corresponding positional relations on the scanning surface may be equidistant.

To achieve the above object, according to the present invention, the scanning lens has a strain characteristic corresponding to the characteristic of the major scanning deflection and such scanning lens is pivotally moved correspondingly to the characteristic of the minor deflection to thereby eliminate the strain in the direction of the minor deflection and make constant the scanning speed in both the major and minor directions, thus providing a strain-free scanning figure.

The invention will become more fully apparent from the following detailed description thereof taken in conjunction with the accompanying drawings.

BRIEF DESCRIPTION OF THE DRAWINGS

FIGS. 4A, 5A and 6A are characteristic graphs illustrating the relations between time t and major deflection rotation angle ω, when equal angular speed major deflection is effected by the use of fθ lens, when major deflection by sine vibration is effected, and when equal angular speed major deflection is effected by the use of tan θ lens.

FIGS. 4B, 5B and 6B are characteristic graphs illustrating the relations of each scanning lens for effecting the major scanning at an equal speed with the major deflection angle $\theta_1$, correspondingly to the case of FIGS. 4A, 5A and 6A.

FIG. 13 illustrates another embodiment of the two-dimensional scanning device of the present invention.

DESCRIPTION OF THE PREFERRED EMBODIMENTS

Figure 3:
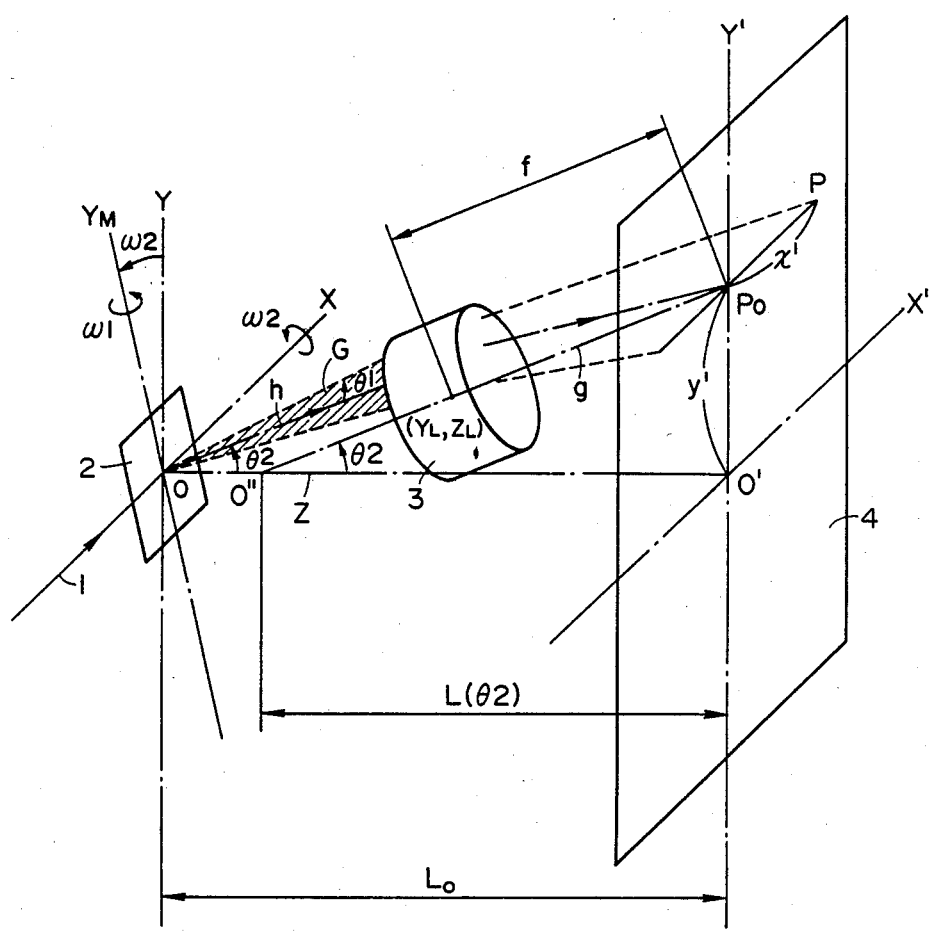
FIG. 3 schematically illustrates the principle of the construction of the two-dimensional scanning device according to the present invention.

FIG. 3 shows the principle of the construction of the two-dimensional scanning device according to the present invention. In FIG. 3, it is to be understood that an incident parallel beam 1 is conditioned so that the major scanning deflection plane of each incident beam 1 is made planar by a two-dimensional deflecting mirror 2. In the case of FIG. 3, it should be understood that the incident beam 1 is incident in parallelism to the X-axis (in the shown example, the incident beam 1 is contained in the X-axis). It is also to be understood that the two-dimensional deflecting mirror 2 is pivotally moved about an axis $Y_M$ always parallel to the mirror surface thereof for the purpose of major scanning deflection and moreover is pivotally moved about an axis orthogonal to the axis $Y_M$ or about the X-axis parallel to the orthogonal axis for the purpose of minor scanning deflection.

In FIG. 3, the case of the minor deflection for the angle of rotation $\omega_2$ about the X-axis and the case of the major deflection for the angle of rotation $\omega_1$ about the axis $Y_M$ parallel to the deflecting mirror surface are considered. It is to be understood that the axis $Y_M$ always lies in Y-Z plane and it is assumed for simplicity of description that the origin O lies on the axis $Y_M$, although generality is not lost even if the origin O of the co-ordinates XYZ does not lie on the axis $Y_M$. As shown in FIG. 3, when the beam 1 is incident in parallelism to the X-axis, the minor deflection angle $\theta_2$ is equal to $\omega_2$ and the major deflection angle $\theta_1$ is equal to 2 $\omega_1$. That is, the major deflection plane G when the minor deflection angle is $\omega_2$ is a plane and therefore, in the present invention, a scanning lens 3 is appropriately rotated in synchronism with the minor deflection so that the major deflection plane G and the optic axis g of the scanning lens 3 are always parallel to each other. Moreover, the scanning lens 3 is appropriately moved in synchronism with the minor deflection so that the intersection $P_o$ between the optic axis g and a scanning plane 4 is always positioned at the focus of the scanning lens 3.

Under the foregoing conditions, the major scanning line is always a straight line and the co-ordinates x', y' of a point P by the two-dimensional deflection scanning are expressed as follows:

$$x' = F_1(\theta_1) \quad (1)$$

$$y' = F_2(\theta_2) \quad (2)$$

where $\theta_1$ and $\theta_2$ represent the major deflection angle and the minor deflection angle, respectively, and in the case of FIG. 3, they are $$\theta_1 = 2\omega_1 \quad (3)$$

$$\theta_2 = \omega_2 \quad (4)$$

Figure 1:
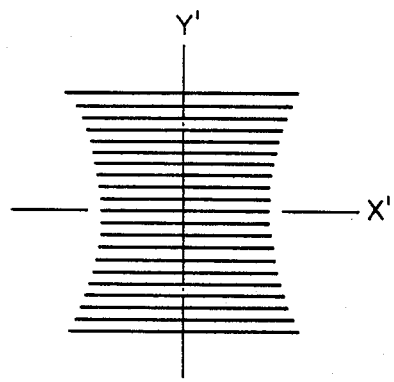
FIG. 1 shows an example of the strain figure provided by the two-dimensional scanning device according to the prior art.
Figure 2:
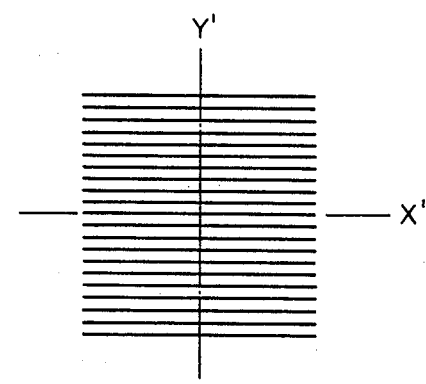
FIG. 2 shows an example of the strain-free figure provided by the present invention.

$F_1(\theta_1)$ is the strain characteristic function of the scanning lens 3 by the major deflection characteristic, and $F_2(\theta_2)$ is function representing the rotation characteristic of the scanning lens 3 by the minor deflection characteristic, and in the present invention, these characteristics are simply realized by optical and mechanical means, whereby the major scanning lines on the scanning plane are made into straight lines and no strain is created in the direction of minor deflection, to thereby obtain the strain-free scanning figure shown in FIG. 2.

Description will now be made of the basic form for effecting the major scanning and the minor scanning at predetermined speeds in the present invention.

As regards the major deflection, the strain characteristic of one of the driving system therefor and the scanning lens can be endowed with a degree of freedom and by setting the characteristic of one of them, the characteristic of the other is determined.

First, consideration is given to a case where the driving system for the major deflection effects an equal angular speed deflection and the major deflection rotation angle $\omega_1$ thereof is set so that it is proportional to time as follows:

$$\omega_1 = K_1 t \quad (5)$$

($k_1$ = constant)
In this case, from equation (3), $$\theta_1 = 2\omega_1 = 2k_1 t,$$

hence, if the strain characteristic of the scanning lens is as follows in equation (1):

$$F_1(\theta_1) = f\theta_1 \quad (6),$$

then equation (1) is differentiated by time to obtain:

$$\frac{dx'}{dt} = \frac{dF_1(\theta_1)}{dt} = f\frac{d\theta_1}{dt} = 2K_1 f = \text{constant} \quad (6')$$

That is, the major deflection scanning speed dx'/dt is constant.

Secondly, where the driving system for the major deflection effects a sine vibration deflection and the major deflection rotation angle $\omega_1$ thereof is set so that it effects sine wave vibration of amplitude $\phi_1$ for time t as expressed by $$\omega_1 = \phi_1 \sin T_1 t \quad (7),$$

($T_1$ = constant)
the major deflection scanning speed is made constant by rendering the strain characteristic function $F_1(\theta_1)$ of the scanning lens into $$F_1(\theta_1) = 2\phi_1 f \sin^{-1}(\theta_1/2\phi_1) \quad (8)$$

That is, $$\frac{dx'}{dt} = \frac{dF_1(\theta_1)}{d\theta_1} \cdot \frac{d\theta_1}{dt} = 2\frac{dF_1(\theta_1)}{d\theta_1} \cdot \frac{d\omega_1}{dt} \quad (9)$$

$$= \phi_1 T_1 f = \text{constant}$$

and it is thus seen that the major deflection scanning speed is constant.

Description has been made of the case where the scanning lens is endowed with a strain characteristic so as to achieve the equal speed scanning on the scanning plane by setting a driving system having a characteristic which is an equal angular speed deflection or a sine vibration deflection, and thirdly, description will be made of are example in which the scanning lens is not particularly endowed with the strain characteristic but a special deflection characteristic is imposed on the primary deflection driving system to thereby make the major scanning speed constant. In this case, the strain characteristic function of the strain-free lens is $$F_1(\theta_1) = f \tan \theta_1$$

and by setting a driving system whose major deflection rotation characteristic is $$\omega_1 = \tfrac{1}{2} \tan^{-1}(k_1 t) \quad (10),$$

($K_1$ = constant)
the major scanning speed can be made constant. That is, $$\frac{dx'}{dt} = \frac{dF_1}{d\theta_1} \cdot \frac{d\theta_1}{dt} = 2 \cdot \frac{dF}{d\theta_1} \cdot \frac{d\omega_1}{dt} \quad (11)$$

$$= fk_1 = \text{constant}$$

Again in this case, the major scanning speed is constant.
The major deflection will now be described.
Firstly, the minor deflection driving system is set so that the minor deflection rotation characteristic is proportional to time t as expressed by $$\omega_2 = K_2 \cdot t \quad (12)$$

($K_2$ = constant)
and the optic axis g of the scanning lens 3 is moved by the same amount as minor deflection angle $\theta_2 = \omega_2 = K_2 \cdot t$, and in FIG. 3, the distance $L(\theta_2)$ between the intersection O'' between the optic axis g and the Z-axis and the scanning plane 4 is approximately determined as $$L(\theta_2) = (C_1 \cdot \theta_2 / \tan \theta_2) \qquad (13)$$

($C_1$: constant) the axis g is rotated through the same angle as the minor deflection angle $\theta_2$ and is moved so as to intersect the Z-axis at the point O" which is located at the distance $L(\theta_2)$ from the point O', given by the equation (13), and the principal point position coordinates $Y_L$, $Z_L$ of the scanning lens 3 are moved to positions expressed by $$Y_L = L(\theta_2) \cdot \tan \theta_2 - f \sin \theta_2 \qquad (14)$$

$$Z_L = L(\theta_2) - f \cos \theta_2 \qquad (15),$$

whereby the minor scanning speed on the scanning plane 4 can be made constant. $Z_L$ is the distance from the point O" on the Z-axis and $Y_L$ is the distance from the Z-axis in the direction of the Y-axis. That is, if the optic axis g of the scanning lens 3 is inclined by the same angle as the minor deflection angle while satisfying equation (13) and the lens 3 is moved so that the principal point of the scanning lens 3 is coincident with the position represented by equations (14) and (15), then the focus of the lens 3 is contained in the scanning plane 4. From FIG. 3, the minor deflection position y' thereof is $$Y' = L(\theta_2) \tan \theta_2 \qquad (16)$$

and therefore, by substituting equation (13) for equation (16), the following is obtained:

$$y' = C_1 \cdot \theta_2 = C_1 \cdot \omega_2 = C_1 \cdot K_2 \cdot t$$

That is, the minor deflection speed $dy'/dt$ becomes:

$$(dy'/dt) = C_1 \cdot K_2 = \text{constant} \qquad (17)$$

Secondly, where the driving system is set so that the minor deflection rotation characteristic effects sine vibration of amplitude $\phi_2$ with respect to time t as expressed by $$\omega_2 = \phi_2 \cdot \sin T_2 \cdot t \qquad (18)$$

($\phi_2$ = constant, $T_2$ = constant)
the minor deflection angle expressed as $$\theta_2 = \omega_2 = \phi_2 \sin T_2 \cdot t$$

is used as in the first case to determine the distance $L(\theta_2)$ between the intersection between the optic axis g of the scanning lens 3 and the Z-axis and the scanning plane 4 as $$L(\theta_2) = \frac{\phi_2 C_2 \sin^{-1}\left(\frac{\theta_2}{\phi_2}\right)}{\tan \theta_2} \qquad (19)$$

and the principal point position co-ordinates $Y_L$, $Z_L$ of the scanning lens 3 are rotated to the positions expressed by equations (14) and (15), whereby the minor scanning speed on the scanning plane 4 can be made constant.

Thirdly, description will be made of a case where the intersection between the optic axis of the scanning lens 3 and the Z-axis is fixed. In this case, the minor scanning speed can be made constant by setting the driving system so that the rotation angle $\omega_2$ is expressed as $$\omega_2 = \tan^{-}(k_2 \cdot t / C_3) \qquad (20)$$

That is, from FIG. 3, $$y' = C_3 \cdot \tan \theta_2 = C_3 \cdot \tan \omega_2 \qquad (21)$$

and hence, by substituting equation (20) for equation (21), the following is obtained:

$$y' = k_2 \cdot t$$

and thus, $$(dy'/dt) = k_2 = \text{constant} \qquad (22)$$

That is, again in this case, the minor scanning speed is constant.

In any of the foregoing cases of minor deflection, it is apparent from FIG. 3 that the rotation characteristic of the scanning lens 3 resulting from the minor deflection characteristic which is $F_2(\theta_2)$ in equation (2) is $$F_2(\theta_2) = L(\theta_2) \cdot \tan \theta_2$$

FIG. 4A shows the equal angular speed major deflection rotation angle $\omega_1$ (based on equation (5)) with respect to time t when the equal angular speed principal deflection is effected by the use of an fθ lens, and FIG. 4B shows the strain characteristic (based on equation (6)) with respect to the major deflection angle $\theta_1$ of the fθ lens for obtaining the equal angular scanning for the equal angular speed major deflection.

FIG. 5A shows the major deflection rotation angle $\omega_1$ (based on equation (7)) which effects sine vibration with respect to time t, and FIG. 5b shows the strain characteristic (based on equation (8)) with respect to the major deflection angle $\theta_1$ of an arc sine lens for obtaining the equal speed scanning for the major deflection which effects sine vibration.

FIG. 6A shows the major deflection rotation angle $\omega_1$ (based on equation (10)) for effecting equal speed scanning by the use of an ordinary strain-free scanning lens (tan θ lens), and FIG. 6B shows the strain characteristic with respect to the major deflection angle $\theta_1$ of the ordinary strain-free scanning lens.

When the minor deflection characteristic is an equal angular speed deflection as is expressed by equation (12), the characteristic becomes just the same as the characteristic in which $\omega_1$ is replaced by $\omega_2$ in FIG. 4A and the corresponding rotation characteristic $F_2(\theta_2)$ becomes just the same as the characteristic in which $\theta_1$ and $F_1$ are replaced by $\theta_2$ and $F_2$, respectively, in FIG. 4B.

Next, when the minor deflection characteristic is a sine vibration deflection as is expressed by equation (18), the characteristic becomes just the same as the characteristic in which $\omega_1$ is replaced by $\omega_2$ in FIG. 5a, and the corresponding rotation characteristic $F_2(\theta_2)$ is shown by a characteristic in which $\theta_1$ and $F_1$ are replaced by $\theta_2$ and $F_2$, respectively, in FIG. 5b.

When the minor deflection characteristic is such a deflection as expressed by equation (20), the characteristic is shown by a characteristic in which $\omega_1$ is replaced by $\omega_2$ in FIG. 6A, and the corresponding rotation characteristic $F_2$ is shown by a characteristic in which $\theta_1$ and $F_1$ in FIG. 6B are replaced by $\theta_2$ and $F_2$, respectively.

Figure 7A:
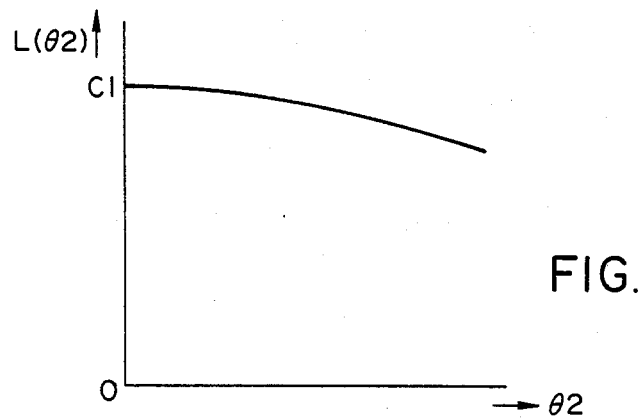
FIGS. 7A, 7B and 7C are characteristic graphs illustrating the distance $L(\theta_2)$ shown in FIG. 3 for the minor deflection angle $\theta_2$ with respect to the cases where the minor deflection characteristic is equal angle deflection, sine deflection and inverse tangent deflection.
Figure 7B:
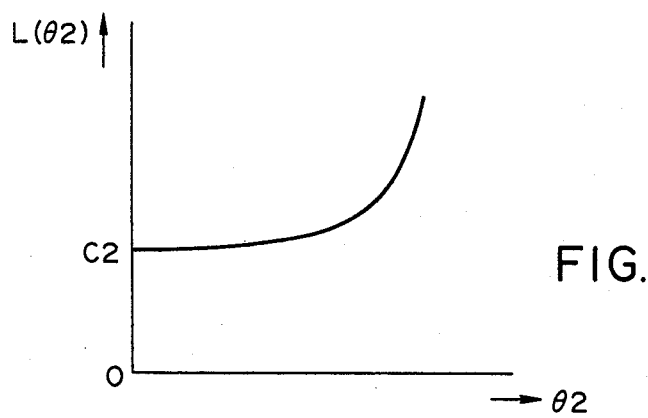
Figure 7C:
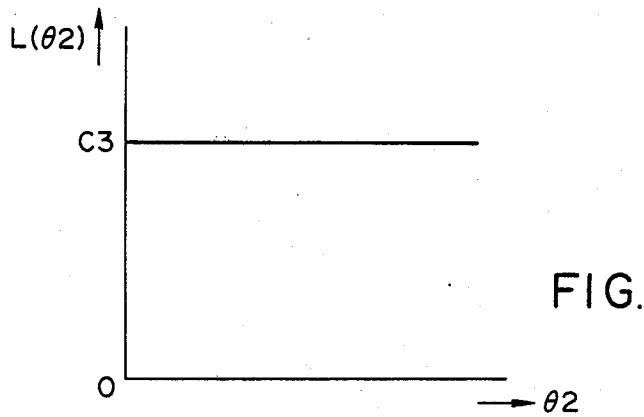

FIGS. 7A, 7B and 7C show the distance $L(\theta_2)$ between the intersection between the optic axis g of the scanning lens 3 in FIG. 3 and the Z-axis and the scanning plane 4 with respect to the minor deflection angle $\theta_2$. FIG. 7A refers to a case where the minor deflection characteristic corresponds to the case of equal angular speed, FIG. 7B refers to a case where the minor deflection characteristic corresponds to the case of sine vibration, and FIG. 7C refers to a case where the minor deflection characteristic corresponds to the case where it is shown by the inverse tangent function of equation (20).

Figure 8A:
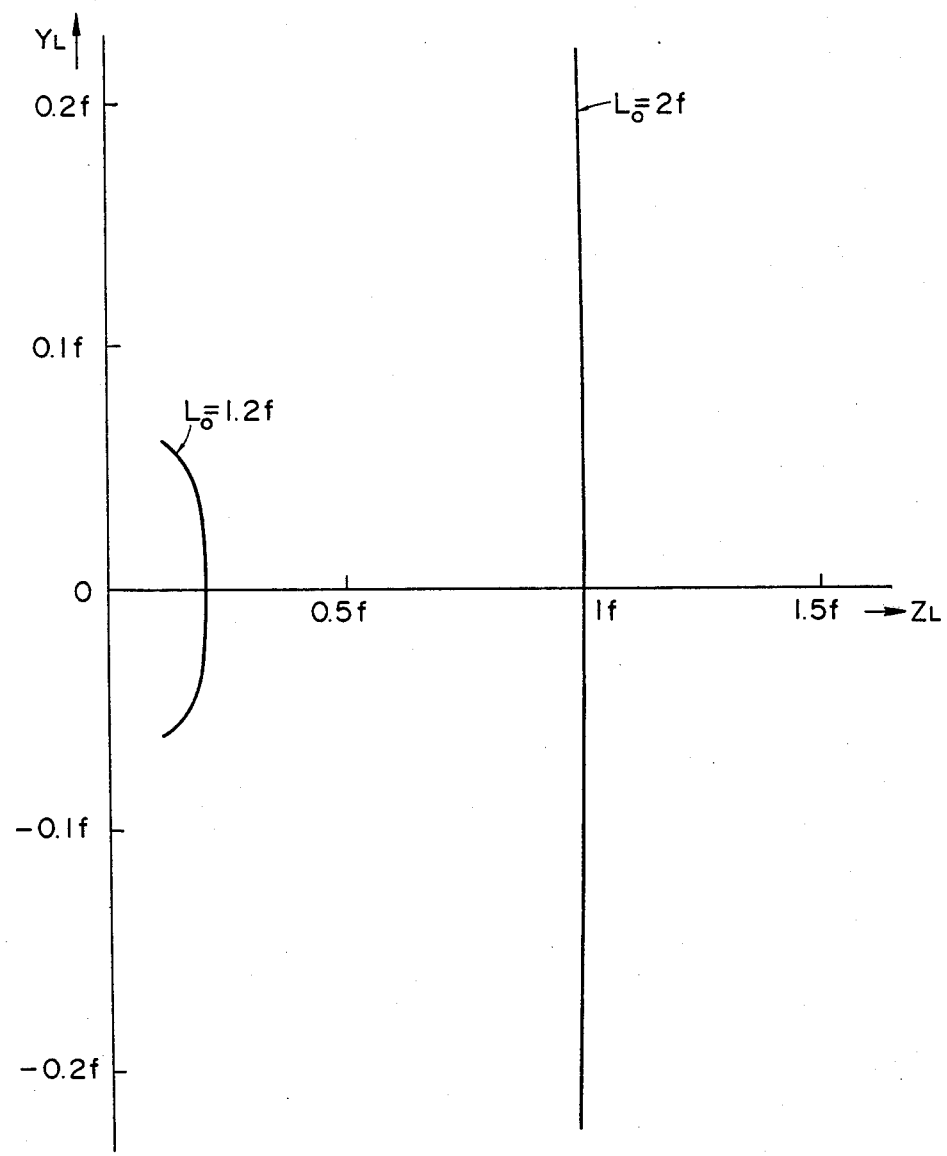
FIGS. 8A, 8B, and 8C are characteristic graphs illustrating the manner of variation of the image side principal point positions ($Y_L$, $Z_L$) of the scanning lens with respect to the above-mentioned three cases.
Figure 8B:
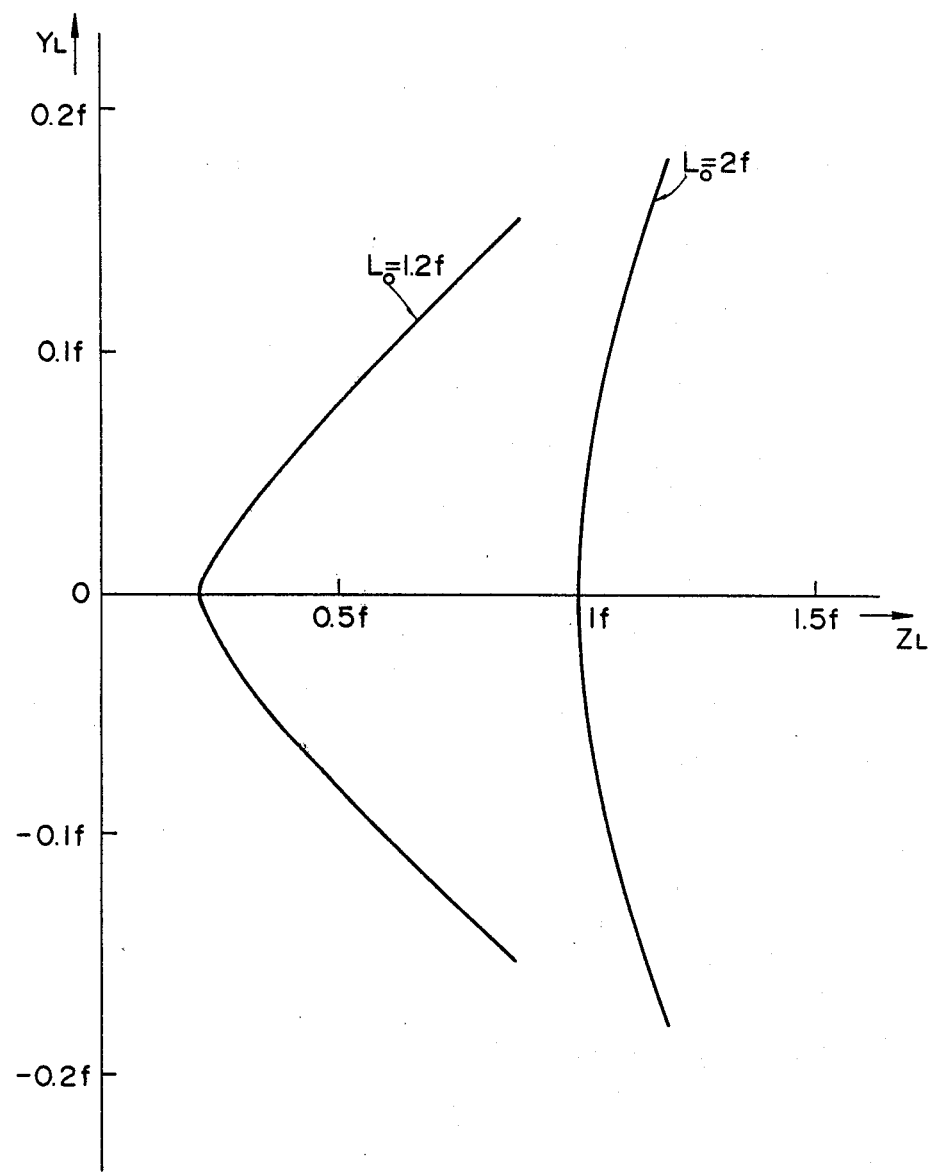
Figure 8C:
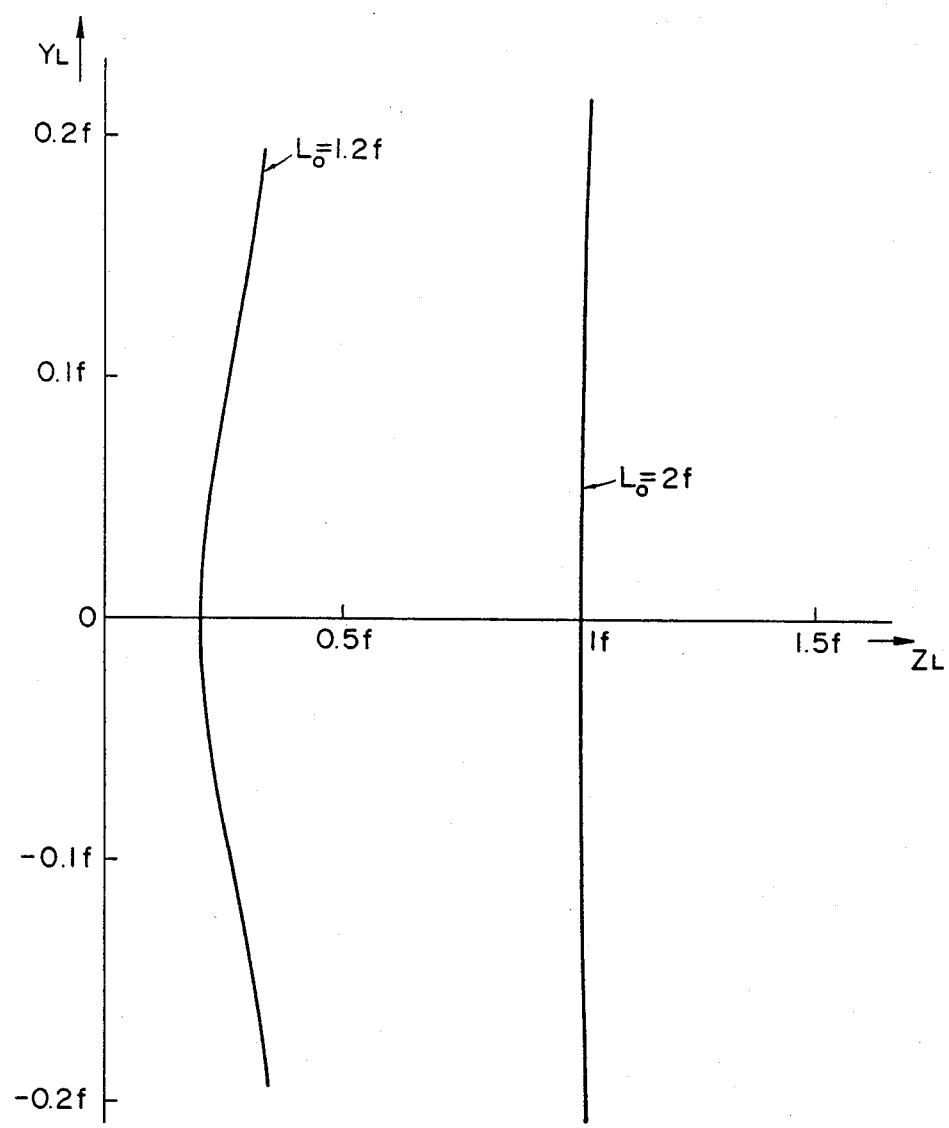

FIGS. 8A, 8B and 8C show the manner in which the image side principal point positions $Y_L$ and $Z_L$ of the scanning lens are varied. FIG. 8A refers to a case where the minor deflection characteristic corresponds to the case of equal angular speed, FIG. 8B refers to a case where the minor deflection characteristic corresponds to the case of sine vibration, and FIG. 8C refers to a case where the minor deflection characteristic corresponds to the case where it is shown by the inverse tangent function of equation (20).

Figure 9:
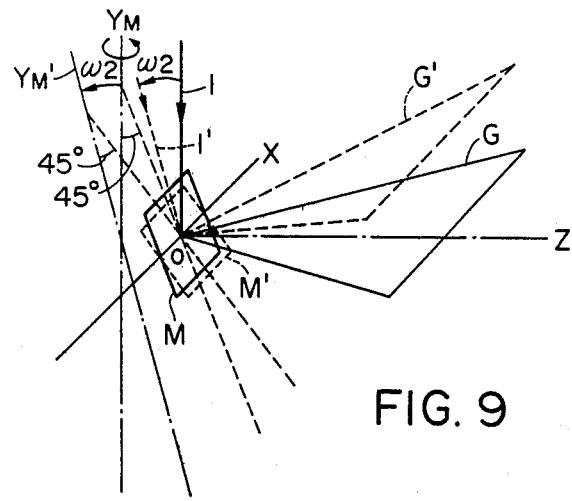
FIG. 9 is a schematic view showing a modification of the two-dimentsional scanning device according to the present invention.

The foregoing embodiment has been described on the basis of FIG. 3 with respect to a case where the major deflection rotation axis $Y_M$ contains the origin O of the orthogonal co-ordinates XYZ, whereas the axis $Y_M$ need not always contain the origin O. For example, as shown in FIG. 9, if minor deflection is effected with the X-axis as the rotational axis so that the deflection plane M always forms 45° with the major deflection rotation axis $Y_M$ and the incident beam 1 is caused to be incident always in parallelism to the axis $Y_M$, the major deflection plane G will become a flat plane. In FIG. 9, the characters having a prime (1) attached thereto designate the elements when minor deflection has been effected by the minor deflection rotation angle $\omega_2$. Again in this case, a development similar to that of the above-described embodiment can be accomplished and need not be described herein.

As regards the time t described in the present invention, the origin thereof (t=0) is set for each major scanning. That is, it is to be understood that the function including the time t with respect to the major deflection or the minor deflection is defined with the time origin set for each deflection.

Figure 10:
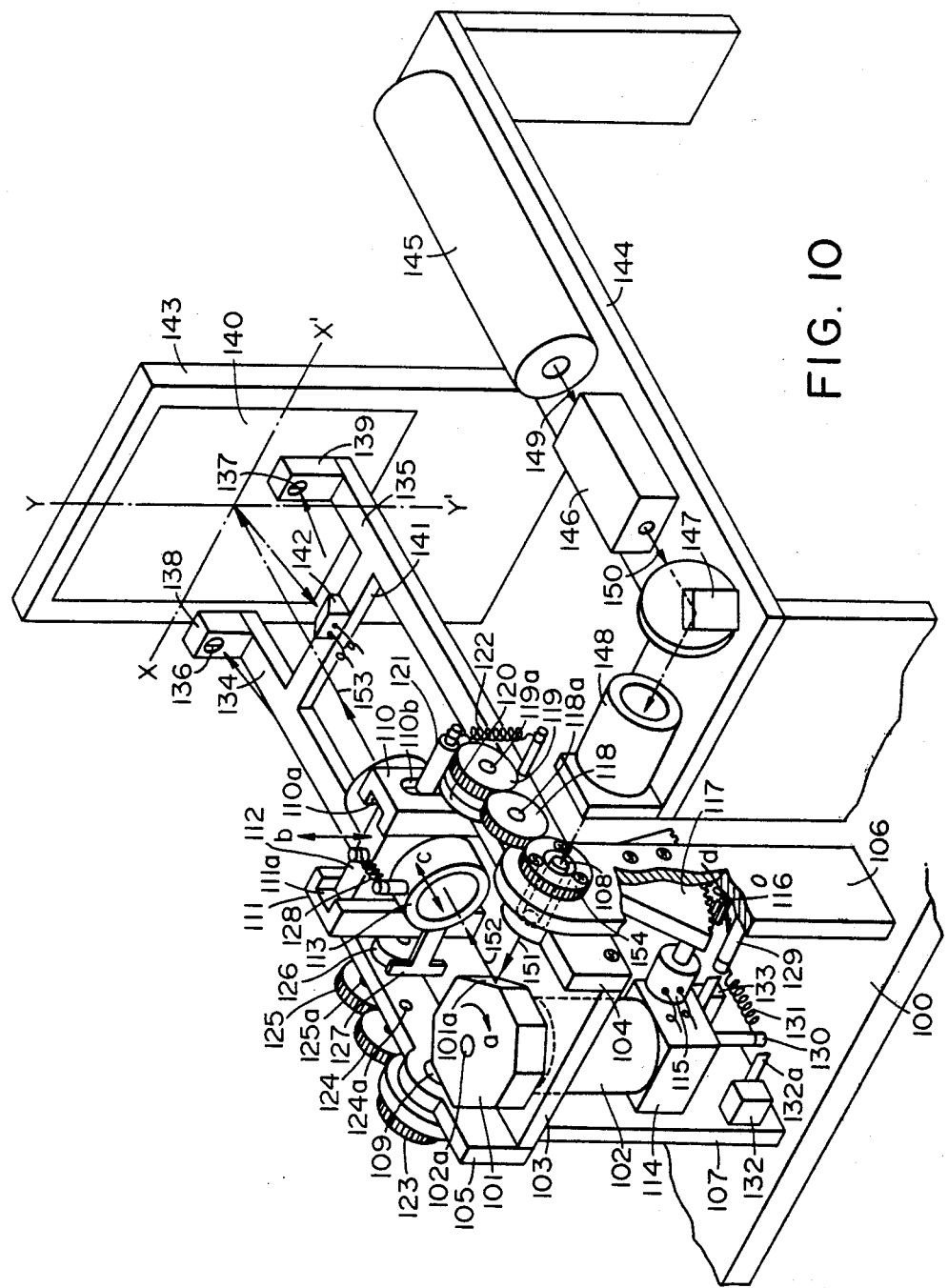
FIGS. 10 and 13 are perspective views showing two specific embodiments of the two-dimensional scanning device according to the present invention.

FIG. 10 shows an embodiment of the two-dimensional scanning device according to the present invention. Designated by 101 in FIG. 10 is a rotatable polygon mirror fixed to the rotary shaft 102a of a drive motor 102. The drive motor 102 is mounted to a base plate 103. Side plates 104 and 105 extend upwardly from the opposite ends of the base plate 103 and are fitted to shafts 108 and 109 provided in bearing plates 106 and 107 projectedly provided on a plate 100. The shaft 108 is a hollow shaft which may pass a light beam therethrough. Grooved posts 110 and 111 are projectedly provided on the front portion of the base plate 103 and a lens plate 112 is fitted in the grooves 110a and 111a of the grooved posts 110 and 111 so that the lens plate 112 is vertically movable. On the other hand, a scanning lens 113 is axially movably fitted in the lens plate 112.

When the drive motor 102 is rotated, the rotatable polygon mirror 101 fixed to the rotary shaft 102a of the motor is rotated at an equal angular speed in the direction of arrow a. On the other hand, the lower end of the rotary shaft 102a is connected to a gear box 114. An electro magnetic clutch 115 is connected to the output shaft of the gear box 114, and a gear 116 is coupled to the output shaft of the electromagnetic clutch 115. This gear 116 meshes with a semicircular gear 117 fixed to the bearing plate 106 for rotation about the center of the shaft 108 and is rotated by the rotation of the motor 102 when the clutch 115 is connected, and revolves around the outer periphery of the fixed semicircular gear 117 at an equal speed. By the gear 116 revolving about the shaft 108, the base plate 103 to which the drive motor 102 is mounted and all the members provided on the base plate 103 are rotated about the shafts 108 and 109.

A gear 154 is fixed to the right-hand bearing plate 104 with the center of the shaft 108 as the center of the circumference thereof. On the other hand, gears 118 and 119 having the same number of teeth as the gear 154 successively mesh with the gear 154 and are mounted on the right side plate 104 by respective rotary shafts 118a and 119a. Accordingly, when the base plate 103 is rotated through $\theta°$, the gear 119 is also rotated through $\theta°$. A vertically movable cam disc 120 is secured to the gear 119 coaxially with the rotary shaft 119a thereof. A follower bar 121 is studded on the lens plate 112 and this follower bar 121 passes through a slot 110b formed in the grooved plate 110 and is always brought into contact with the cam disc 120 by the tension of a spring 122. Accordingly, when the gear 119 is rotated, the cam disc 120 is rotated to move the lens plate 112 in the direction of arrow b in operative association with the follower bar 121 which follows correspondingly to the variation in cam diameter provided on the outer periphery of the cam disc 120. Accordingly, the scanning lens 113 fitted in the lens plate 112 is likewise moved. That is, the direction of movement in the direction of arrow b and the light deflection plane 101a are set parallel to each other.

Figure 11A:
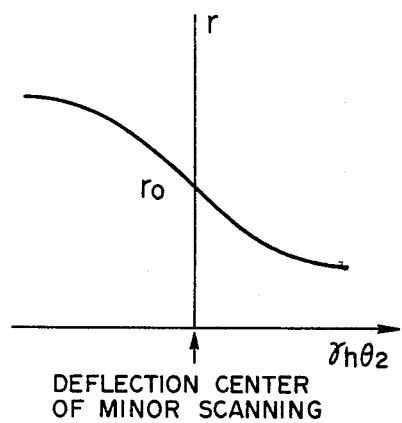
FIGS. 11A and 11B are a characteristic graph and an illustration, respectively, of a vertically movable cam.
Figure 11B:
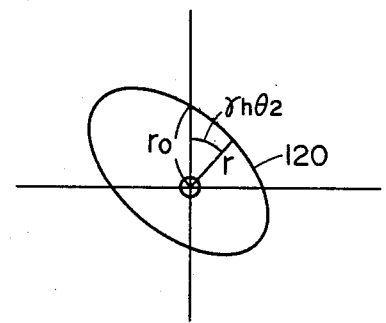

The cam diameter characteristic of the vertically movable cam disc 120 will now be described by reference to FIGS. 11A and 11B. FIGS. 11A and 11B shows the case where the minor deflection rotation characteristic, namely, the rotation characteristic of the base plate 103 shown in FIG. 10, is set to $\theta_2 = K \cdot t$ ($K$=constant).

First, the configuration of the vertically movable cam disc 120 is determined in the manner described hereinafter. In FIG. 3, the axis h passes through the deflection standard point O and lies in the plane containing the Z-axis and the Y-axis, the axis h having an angle $\theta_2$ with respect to the Z-axis. When the minor deflection angle is $\theta_2$, the distance between the the axis h and the optic axis g, i.e., the length of the perpendicular extending from the point O" to the axis h, is the amount of vertical movement of the scanning lens 3, and therefore, if that amount is $\Delta h$, $\Delta h$ is expressed as $\Delta h = -(L_o - L(\theta_2)) \sin \theta_2$ If the gear ratio from the gear 117' for rotating the base plate 103 to the gear 119 for rotating the vertically movable cam disc 120 is $\gamma_h$, the radius vector $\gamma$ of the cam 120 shown in FIG. 11B for the rotation angle $\gamma_h \theta_2$ of the vertically movable cam 120 is expressed as $\gamma = \gamma_o + \Delta h,$ where $\gamma_o$ is the radius vector of the cam 120 when $\theta_2=0$, namely, when the minor deflection is not effected. FIG. 11A depicts the manner of variation in radius vector $\gamma$ for the rotation angle $\gamma_h\theta_2$ of the cam 120. The $L(\theta_2)$ in this case is given by equation (13). $L_o$ is the distance from the scanning plane 4 to the deflection standard point 0.

The configuration of the vertically movable cam disc 120 when the rotation angle characteristic of the minor deflection is set so as to effect sine wave vibration of amplitude $\phi$ for the time t as expressed by $$\theta = \phi \sin T \cdot t$$

($\phi$=constant, T=constant) can also be determined in a manner similar to what has been described above. That is, the amount of vertical movement $\Delta h$ of the vertically movable cam disc 120 is expressed as $$\Delta h = -(L_o - L(\theta_2)) \sin \theta_2$$

and therefore, in accordance with this amount of movement $\Delta h$, the radius vector $\gamma$ of the cam 120 may be determined by $$\gamma = \gamma_o + \Delta h.$$

However, the $L(\theta_2)$ in this case is given by equation (19).

Referring again to FIG. 10, a gear 123 is fixed to the bearing plate 107 with the center of the shaft 109 as the center of the circumference thereof. On the other hand, gears 124 and 125 having the same number of teeth as the gear 123 successively mesh with the gear 123 and are mounted on the left side plate 105 by respective rotary shafts 124a and 125a. Accordingly, when the base plate 103 is rotated through $\theta°$, the gear 125 is also rotated through $\theta°$. An axially movable cam disc 126 is secured to the gear 125 coaxially with the rotary shaft 125a thereof. A follower member 127 is studded on the scanning lens 113 and this follower member 127 is always brought into contact with the cam 126 by the tension of a spring 128. Accordingly, when the gear 125 is rotated, the cam disc 126 is rotated to move the scanning lens 113 in the direction of arrow c in operative association with the follower member 127 which follows corresponding to the variation in outer periphery or cam diameter of the cam disc 126.

The cam diameter characteristic of the axially movable cam disc 126 will now be described by reference to FIGS. 12A and 12B.

Figure 12A:
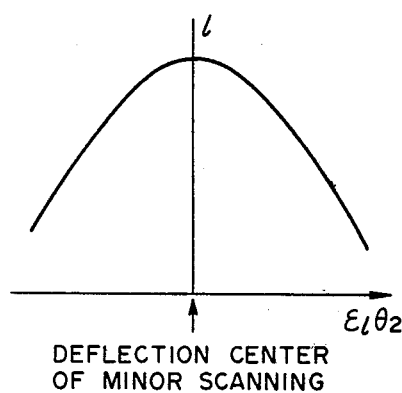
FIGS. 12A and 12B are a characteristic graph and an illustration, respectively, of an axially movable cam.
Figure 12B:
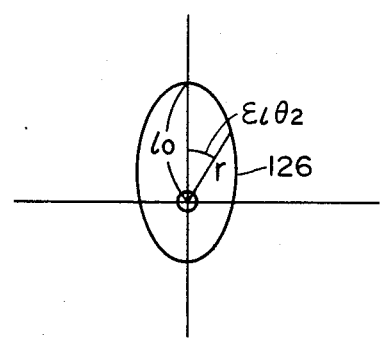

FIGS. 12A and 12B refer to the case where the minor deflection rotation characteristic, namely, the rotation characteristic of the base plate 103 shown in FIG. 10, is set to $$\theta_2 = K \cdot t \quad (K = \text{constant})$$

The configuration of the cam disc 126 for focusing is set in the manner described hereinafter. From FIG. 3, the amount of movement $\Delta l$ of the lens 3 in the direction of the optic axis is expressed as $$\Delta l = L_o(\cos \theta_2 - 1) + L_o(\theta_2) \cdot (\sec \theta_2 - \cos \theta_2)$$

and hence, the radius vector l of the cam disc 126 is expressed as $$l = l_o + \Delta l.$$

FIG. 12B shows the radius vector l of the cam disc 126 for the rotation angle $s_i\theta_2$, where $s_i$ is the gear ratio from the gear 123 for rotating the base plate 103 to the gear 125 for rotating the cam 126.

FIG. 12a shows the variation in radius vector l of the cam 126 for the rotation angle $s_i\theta_2$. However, the $L(\theta_2)$ in the developed equation of the aforementioned amount of movement $\Delta l$ is given by equation (13).

Where the minor deflection rotation characteristic effects sine vibration of amplitude $\phi$ with respect to time t as expressed by $$\theta = \phi \sin (T \cdot t) \quad (\phi = \text{constant, T=constant}),$$

the characteristic of the focussing cam 126 is similar to that of the cam 120 and the amount of movement $\Delta l$ in the direction of the optic axis is given by
$$\Delta l = L_o(\cos \theta_2 - 1) + L_o(\theta_2) \cdot (\sec \theta_2 - \cos \theta_2)$$

and hence, by using this amount of movement $\Delta l$, $$l = l_o + \Delta l$$

is obtained as the radius vector. However, the $L(\theta_2)$ in this case is given by equation (19). The $l_o$ in the equation representing the radius vector l is the radius vector of the cam 126 when the minor deflection is not effected.

Turning back to FIG. 10, a pin member 129 is studded on the right bearing plate 106 and a spring 131 is stretched between this pin member 129 and a pin member 130 studded on the gear box 114. Against the force of this spring 131 the gear 116 continues to rotate in the direction of arrow d and when the pin member 130 contacts the tongue piece 132a of a switch such as a microswitch 132, the switch 132 generates a scanning completion signal. In response to the scanning completion signal, the electromagnetic clutch 115 operates to cut off the drive transmission of the motor 102 to the gear 116, so that the gear 116 becomes free to rotate and the pin 130 is pulled in the direction opposite to the direction of arrow d by the compression force of the spring 131 and accordingly, the base plate 103 is also rotated rapidly in counterclockwise direction. In the course of the rotation of the pin member 130 caused by the spring 131, the pin member 130 contacts the switch 133 to stop the counterclockwise rotation of the base plate 103, whereupon the switch 133 generates a scanning start preparation completion signal.

At the ends of bar members 134 and 135 extending from the base plate 103 to the vicinity of a scanning surface 140, photodetectors 138 and 139 provided with knife edges 136 and 137 are disposed so that the light beam emerging from the scanning lens 113 is incident on the photodetectors. A photodetector 142 is appropriately disposed on an arm 141 extending between the bar members 134 and 135 so that the photodetector 142 may detect the refelected light of the scanning beam from the scanning surface 140. The scanning surface 140 is mounted on a holder 143. An optical supporting table 144 carries thereon a laser oscillator 145, a light modulator 146, a mirror regulator 147 and a beam expander lens 148.

The laser beam 149 emitted from the laser oscillator 145 enters the light modulator 146. The laser beam 150 modulated by the light modulator 146 is reflected by the mirror 147 and further has its beam diameter expanded by the beam expander lens 148 and enters one deflecting surface 101a of the polygon mirror 101. The beam 151 having entered the deflecting surface 101a is deflected by the rotation of the deflecting surface 101a and the deflected beam 152 major-scans in the direction of X→X' on the scanned member, namely, the scanning surface 140, through the scanning lens 113. Shortly before the scanning beam 153 enters the scanned member surface 140, the scanning beam 153 impinges on the photodetector 138, so that the photodetector 138 generates an initial position detection signal of the scanning beam 153. Since the scanning beam 153 inpinges on the photodetector 139 after having passed through the scanned member surface 140, the photodetector 139 generates a one-line scanning completion signal. By making the scanning beam 153 into an unmodulated beam having a predetermined level of intensity, picture information on the scanned member surface 140 is generated in the photodetector 142 which receives the reflected light from the scanned member surface 140.

According to the present invention, as described above, the rotatable polygon mirror 101 repeats major scanning by deflecting the laser beam 149 in the direction of X→X' on the scanned member surface 140 in response to rotation of the motor 102 while, on the other hand, the polygon mirror effects minor scanning by deflecting the laser beam 149 also in the direction of Y→Y' on the scanned member surface 140 by rotating the base plate 103 in response to rotation of the motor 102.

While the foregoing example has been shown with respect to the case of reading from the two-dimensional figure formed by the laser beam, it is of course possible to apply a suitable modulation input to the photodetector 146 to thereby write on the scanning surface 140 a two-dimensional figure corresponding thereto.

Figure 13:
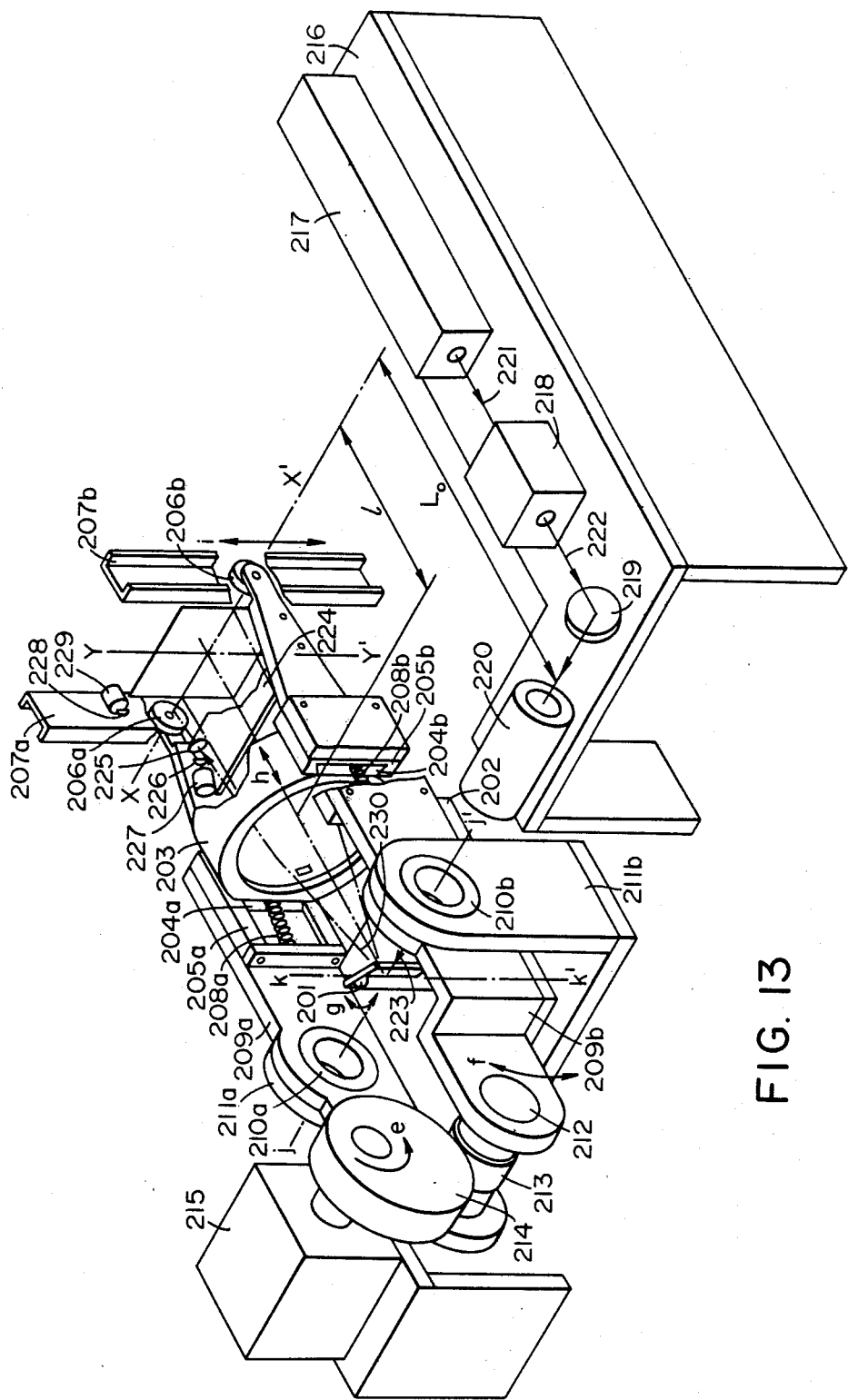

FIG. 13 shows another embodiment of the two-dimensional scanning device according to the present invention. Designated by 201 in FIG. 13 is a mirror for major deflection pivotably mounted on a bottom plate 202. The rotational axis k—k' of the mirror 201 is orthogonal to the minor deflection rotation axis j—j' and its relative position is always invariable. The major deflection rotation characteristic thereof is represented by the following equation and is rotated in the direction of arrow g.

$$\omega_1 = C_4 \tan^{-1}(C_5 t)$$

where
   $\omega_1$: rotation angle of mirror 201
   $C_4, C_5$: constants, t: time A scanning lens 203 is an ordinary strain-free lens and the optic axis thereof is always coincident with the major deflection plane and the bodytube thereof is fixed to cross arms 204a and 204b. The cross arms 204a and 204b are smoothly slidable in grooves formed in grooved plates 205a and 205b in the direction of h. Freely rotatable guide rollers 206a and 206b are mounted on the fore ends of the cross arms 204a and 204b. These guide rollers 206a and 206b roll on the inner surfaces of guide rails 207a and 207b as indicated by arrow i while being always urged against the guide rails 207a and 207b by compression springs 208a and 208b. The length l of the cross arms 204a and 204b is determined by the focal length of the scanning lens 203 and the plane formed by the line passing through the centers of rotation of the rollers 206a and 206b on the fore ends of the cross arms 204a and 204b is always coincident with the scanning plane XY. The grooved plates 205a and 205b are fixed to side plates 209a and 209b, respectively. The side plates 209a and 209b are held by support members 211a and 211b through a bearing 210a and a hollow bearing 210b and are freely rotatable about the minor deflection rotation axis j—j'. The side plates 209a and 209b are coupled by a cam follower shaft 212, and a cam follower 213 is rotatably fitted on the cam follower shaft 212 so that the cam follower 213 is always in contact with the cam surface of a cam 214. This cam 214 is mounted on the shaft of a drive motor 215 and is rotatable at an equal angular speed in the direction of arrow e. By the combination of the cam characteristic of the cam 214 and the cam follower 213, the scanning lens body held by the bearings 210a, 210b and the support members 211a, 211b is rotated about the axis j—j' in the direction of arrow f to thereby effect the minor deflection. The minor deflection rotation characteristic thereof is expressed by the following equation:

$$\omega_2 = \tan^{-1}(k_2 t/L_o)$$

where
   $\omega$: the rotation angle of the body relative to the axis j—j'
   $k_2$: constant
   $L_o$: the distance between the minor deflection rotation axis and the scanning plane XY
   T: time When the body is rotated on the basis of the above equation, the guide rollers 206a and 206b roll on the inner surfaces of the guide rails 207a and 207b. Along therewith, the cross arms 204a and 204b are reciprocally moved by being drawn out of the grooved plates 205a and 205b or forced back thereinto, and the scanning lens 203 integral with the cross arms 204a and 204b are likewise reciprocally moved, as a result of which the focus of the scanning lens 203 is always formed on the scanning plene XY. In the present embodiment, the minor deflection rotation is effected by the cam 214 and this leads to an advantage that the quick return of the minor deflection is easy.

An optical supporting table 216 carries thereon a laser oscillator 217, a light modulator 218, a mirror regulator 219 and a beam expander lens 220. The laser beam 221 emitted from the laser oscillator 217 enters the modulator 218 and the laser beam 222 modulated thereby is reflected by the mirror 219 and further has the beam diameter thereof expanded by the beam expander lens 220, and then passes through the minor deflection rotation axis j—j' of the hollow portion of the hollow bearing 210b to the above-described major deflection mirror 201. The beam 223 having entered mirror 201 is deflected by the rotation g of the mirror 201 and the defelected beam 230 scans in the direction X—X' on the scanning plane through the scanning lens 203. A half mirror 225, a knife edge 226 and a photodetector 227 are disposed on a bridging member 224 having its opposite ends secured to the cross arms 204a and 204b, and a knife edge 228 and a photodetector 229 are disposed on the guide rail 207a. The half mirror 225, knife edge 226 and photo-detector 227 detect a beam having a certain predetermined angle of deviation, of the beam 230 deflected by the major deflection mirror 201, and generate a heading signal of major scanning. The knife edge 228 and photodetector 229 detect the beam having passed through the half mirror 225 when the rotation angle of minor deflection has become a certain predetermined angle, and generate a heading signal of minor scanning.

According to the present invention, as is apparent from the foregoing description, the scanning lens has a strain characteristic corresponding to the characteristic of main scanning deflection and by pivotally moving such scanning lens correspondingly to the characteristic of minor deflection, it is possible to eliminate the strain in the direction of minor deflection and make constant the scanning speeds of both the major scanning and the minor scanning and thus, to obtain a strain-free scanning figure. Accordingly, strain-free two-dimensional scanning can be realized by a relatively simple optical and mechanical construction without the necessity of correcting the strain of the scanning figure by the use of complicated electrical signal processing means as has conventionally been done.

What we claim is:

1. A two-dimensional scanning device comprising:
   deflecting means having first and second orthogonal rotation axes for two-dimensionally deflecting a beam incident thereon in parallelism to said second rotation axis;
   light source means for supplying a parallel beam to said deflecting means;
   a scanned surface subjected to two-dimensional scanning by the beam deflected by said deflecting means;
   an image forming optical system provided between said scanned surface and said deflecting means; and
   mechanical means for always maintaining parallel to each other a deflection scanning plane formed with lapse of time by the beam deflected around said first rotation axis of said deflecting means and the optic axis of said image forming optical system.

2. The two-dimensional scanning device according to claim 1, wherein said image forming optical system has a strain characteristic corresponding to the rotation characteristic of said first rotation axis of said two-dimensional deflecting means so as to render constant the speed in the major scanning direction of the beam spot on said scanned surface.

3. The two-dimensional scanning device according to claim 1, wherein said mechanical means rotates the optical axis of said image forming optical system by the same angle as the rotation angle of said second rotation axis.

4. The two-dimensional scanning device according to claim 2, wherein said first rotation axis of said two-dimensional deflecting means is rotated at an equal angular speed and the value $F_1(\theta_1)$ is equal to the value $f \cdot \theta_1$, where $F_1$ is the strain characteristic of said image forming optical system $\theta_1$ is the angle through which said first rotation axis has been rotated from its standard position and f is the focal length of said image forming optical system.

5. The two-dimensional scanning device according to claim 2, wherein the rotation characteristic of said first rotation axis of said two-dimensional deflecting means is a sine characteristic and the value $F_1(\theta_1)$ is equal to the value $2f\phi_1 \sin^{-1}(\theta_1/2\phi_1)$, where $F_1$ is the strain characteristic of said image forming optical system, $\theta_1$ is the angle through which said first rotation axis has been rotated from its standard position, $\phi_1$ is the amplitude of the sine vibration and f is the focal length of said image forming optical axis.

6. The two-dimensional scanning device according to claim 2, wherein the rotation angle $\omega_1$ of said first rotation axis is expressed as $\omega_1 = (\frac{1}{2})\tan^{-1}(K_1 \cdot t)$, the strain characteristic $F_1$ of said image forming optical system is $F_1(\theta_1) = f \cdot \tan \theta$, where $K_1$ is a constant, t is time, $\theta_1$ is the angle through which said first rotation axis has been rotated from its standard position, and f is the focal length of said image forming optical system.

7. A two-dimensional scanning device comprising:
   a deflector having the reflecting surface thereof independently rotatable about a major rotation axis and a minor rotation axis and a minor rotation axis orthogonal to each other, said deflector being adapted for two-dimensionally deflecting an incident light beam which is substantially parallel to said minor rotation axis;
   a light source portion for emitting a light beam to said deflector;
   a scanned surface two-dimensionally scanned by the beam deflected by said deflector;
   an image forming optical system disposed between said deflector and said scanned surface and held so that the optic axis thereof is always parallel to the deflection scanning plane of the light beam deflected around said major axis of said deflector; and
   means for moving said image forming optical system in the direction of the optic axis thereof in synchronism with the rotation of said minor rotation axis so that the light beam condensed by said image forming optical system always maintains a beam spot condition on said scanned surface.

* * * * *

UNITED STATES PATENT AND TRADEMARK OFFICE
CERTIFICATE OF CORRECTION

PATENT NO. : 4,327,959
DATED : May 4, 1982
INVENTOR(S) : KAZUO MINOURA, ET AL.

It is certified that error appears in the above—identified patent and that said Letters Patent is hereby corrected as shown below:

Column 2

Line 26, change "two dimentsional" to --two-dimensional--.

Column 4

Line 57, change "major" to --minor--.

Column 5

Line 29, change "Y'" to --y'--.

Column 9

Line 63, change "$\Delta 1$" to --$\Delta \ell$--.

Line 65, change "$\Delta 1$" to --$\Delta \ell$--.

Line 66, change "1" to --$\ell$--.

Column 10

Line 1, change "$1=1_o + \Delta 1$" to --$\ell = \ell_o + \Delta \ell$--.

Line 4, change "1" to --$\ell$--.

Line 5, change "$s_1$" to --$s_\ell$--, both occurrences.

UNITED STATES PATENT AND TRADEMARK OFFICE
CERTIFICATE OF CORRECTION

PATENT NO. : 4,327,959
DATED : May 4, 1982
INVENTOR(S) : KAZUO MINOURA, ET AL.

It is certified that error appears in the above—identified patent and that said Letters Patent is hereby corrected as shown below:

Column 10

Line 8, change "l" to --$\ell$--.

Line 9, change "$S_1$" to --$S_\ell$--.

Line 11, change "$\Delta l$" to --$\Delta \ell$--.

Line 19, change "$\Delta l$" to --$\Delta \ell$--.

Line 21, change "$\Delta l$" to --$\Delta \ell$--.

Line 23, change "$l = l_0 + \Delta l$" to --$\ell = \ell_0 + \Delta \ell$--.

Line 25, change "$\Delta l$" to --$\Delta \ell$--.

Line 27, change "$L(\theta_2)$" to --$L_0(\theta_2)$--.

Line 28, change "$l_0$" to --$\ell_0$--.

Line 29, change "l" to --$\ell$--.

Line 36, change "d" to --$\underline{d}$--.

Line 44, change "d" to --$\underline{d}$--.

UNITED STATES PATENT AND TRADEMARK OFFICE
CERTIFICATE OF CORRECTION

PATENT NO. : 4,327,959

DATED : May 4, 1982

INVENTOR(S) : KAZUO MINOURA, ET AL.

Page 3 of 4

It is certified that error appears in the above—identified patent and that said Letters Patent is hereby corrected as shown below:

Column 11

Line 58, change "h" to --$\underline{h}$--.

Line 63, change "i" to --$\underline{i}$--.

Line 65, change "l" to --$\ell$--.

Column 12

Line 14, change "e" to --$\underline{e}$--.

Line 23, after "$L_0$" add --)--.

Line 41, change "plene" to --plane--.

Column 14

Line 24, change "$F_1(\theta_1) = f \cdot \tan \theta$," to --$F_1(\theta_1) = f \cdot \tan \theta_1$--.

UNITED STATES PATENT AND TRADEMARK OFFICE
CERTIFICATE OF CORRECTION

PATENT NO. : 4,327,959

DATED : May 4, 1982

INVENTOR(S) : KAZUO MINOURA, ET AL.

It is certified that error appears in the above—identified patent and that said Letters Patent is hereby corrected as shown below:

Column 14

Line 31, delete "a minor rotation axis and", first occurrence.

Signed and Sealed this

Fifth Day of October 1982

[SEAL]

Attest:

GERALD J. MOSSINGHOFF

Attesting Officer

Commissioner of Patents and Trademarks